April 29, 1947.　　　G. D. WILCOX　　　2,419,929
AUXILIARY POWERED VEHICLE CONSTRUCTION
Original Filed Dec. 19, 1938　　3 Sheets-Sheet 1

INVENTOR.
GEORGE D. WILCOX.
BY Walter E. Schirmer
ATTORNEY.

April 29, 1947.　　　G. D. WILCOX　　　2,419,929
AUXILIARY POWERED VEHICLE CONSTRUCTION
Original Filed Dec. 19, 1938　　3 Sheets-Sheet 3

INVENTOR.
GEORGE D. WILCOX.
BY Walter E. Schirmer
ATTORNEY.

Patented Apr. 29, 1947

2,419,929

UNITED STATES PATENT OFFICE 2,419,929

AUXILIARY POWERED VEHICLE CONSTRUCTION

George D. Wilcox, Detroit, Mich., assignor of one-half to Frederick J. Haynes, Detroit, Mich.; Frank C. Cook executor of Frederick J. Haynes, deceased; John Conway Cook executor of George D. Wilcox, deceased Original application December 19, 1938, Serial No. 246,565. Divided and this application October 11, 1939, Serial No. 298,913

19 Claims. (Cl. 180—54)

This invention relates to vehicles, and more particularly is directed to an improved power-drive combination for heavy duty vehicles such as trucks, busses, rail cars and the like.

This application is a division of my copending application, Serial No. 246,565, filed December 19, 1938.

Present day transportation requirements are such that trucks and similar vehicles are powered to carry predetermined pay loads at fairly consistent speeds over flat country. However, it is common experience that such vehicles are frequently overloaded, and even when not overloaded the power in such trucks is not sufficient to maintain adequate speed of the vehicle in climbing grades and the like in hilly or mountainous country. Such vehicles crawl up grades under load at speeds which are so slow as to cause numerous accidents due to attempts of trailing higher speed vehicles to pass the slow moving truck or bus when going up hill. This occurs in spite of highway regulations prohibiting passing under such conditions, due mainly to the extremely slow speed of the heavily loaded vehicle and the impatience of the trailing driver.

In attempting to overcome such a situation it has become increasingly apparent that the solution does not lie in trying to prevent passing under such conditions, but rather in speeding up the slow vehicle to a point where it will not unduly retard traffic on grades. Speeds of twenty to thirty-five miles per hour, for example, would do much to eliminate the accidents as at such speeds traffic would not be impeded to an extent such as to cause disregard for the obvious dangers inherent in passing under such conditions.

One manner in which the speed of the transport vehicle could be increased in climbing grades would be to install larger and more powerful engines therein, adequate to maintain the desired speeds on grades. However, this is impractical since it would produce uneconomical operation of the power unit under normal driving conditions on flat terrain, and the available power would be utilized only occasionally, being wasted during the time that full power was not required.

I have conceived of a manner of solving this problem which will result in economical operation of the truck or bus at all times, without requiring the use of an extremely powerful engine which is utilized at full capacity only at infrequent intervals. The primary concept of my invention is the provision of an auxiliary or booster power unit, of a size and capacity such as to furnish, with the standard or primary power unit now installed in the vehicle, ample power for maintaining the desired speed on grades, but which is only in operation when such power is required, and at other times is inoperative. This eliminates the uneconomical constant operation of a large power unit at all times, whether full power is required or not.

One of the primary objects of the present invention is to provide a secondary or booster power unit, directly coupled to the power train of the vehicle.

Another object of the present invention is to interconnect the booster power unit and a power input gear disposed in driving relation to the clutch shaft of a variable speed transmission that is operated by the main power unit of the vehicle.

It is essential, in order to gain the greatest possible benefit from such a system, that the auxiliary or booster engine be controlled in response to predetermined speed and power requirements in the vehicle, so that it will be operated only at such times that its power is necessary to maintain the vehicle at a predetermined speed. As an example of such a control, but not in any sense as limiting the possible application of the system, it may be desired that the booster engine operate whenever the vehicle speed decreases below 35 miles per hour under full throttle. Under such conditions the booster engine is started, comes up immediately to full torque, and adds its driving effort to that of the primary power source to deliver sufficient torque for maintaining a predetermined speed. Should the speed continue to decrease, even with both units operating, due to extremely heavy loads or extremely steep grades, the system can be arranged to allow shifting into the next gear ratio, and both engines can be used for power in such gear ratio.

Obviously, it would not be desirable to operate the booster engine when moving away from a stop on level territory in low gear with standard axle constructions, and consequently a control may be provided to insure that the booster engine will operate in high or intermediate gears in speed ranges between say 7 and 35 miles per hour. Of course, with modified driving gear assemblies, it is contemplated that the booster engine may be used at all times when additional power is required. Control may be electrical or pneumatic, or a combination of both. I have found that the control responsive to throttle position may readily be a vacuum control from the intake manifold set to operate between 90% to 100% full open throttle position and to become inoperative at below 50% full open throttle.

The speed control, that is, responsive to speed of the vehicle, may be electrical, controlled from a motor-driven generator, with relays wound to cut in and cut out at certain speeds, or responsive to certain propeller shaft speeds, or may be a mechanical control of the centrifugal or governor type.

The two controls must necessarily be interlocked in such manner that neither will independently cause the booster engine to operate.

Another feature of the present invention resides in the provision of a simplified booster mechanism construction which may be manufactured and sold as a unit for attachment to vehicles now in use, without requiring any appreciable modification in the drive mechanism already installed in the vehicle.

Other objects and advantages of the present invention will appear more fully from the following detailed description which, taken in conjunction with the accompanying drawings, will disclose to those skilled in the art the particular construction and operation of a preferred form of the present invention.

Figure 1:
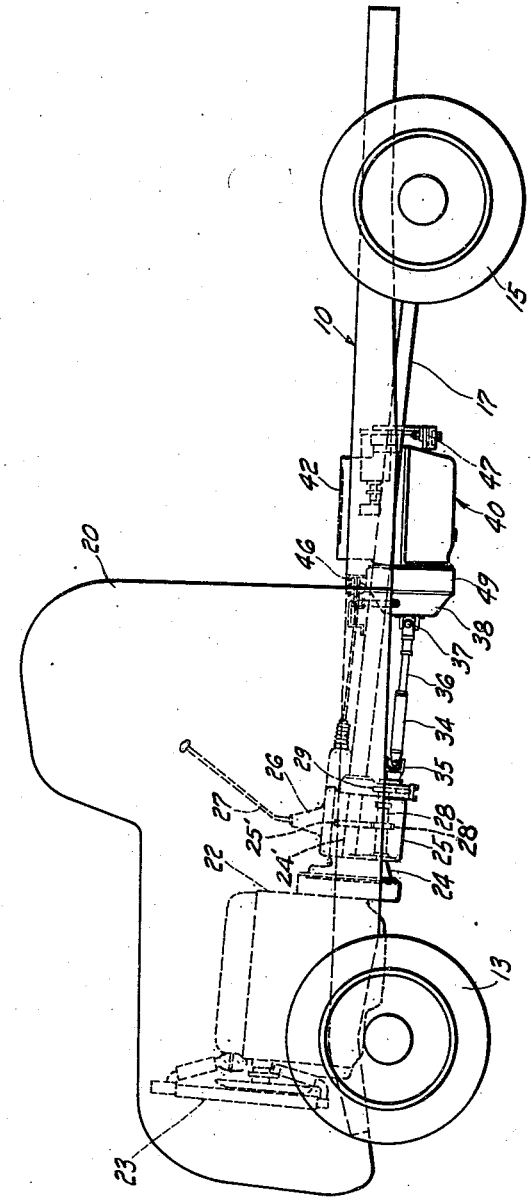
Figure 1 is a side elevational view, parts being shown somewhat diagrammatically, of a vehicle embodying the invention.

Considering now the drawings in detail, a truck chassis is indicated generally at 10 and includes a front axle assembly 12 having the steering wheels 13 secured at opposite ends thereof. The chassis is also provided with a rear axle 14 which may be of the banjo full-floating type, and may have either single or dual wheels 15 journalled at the outer ends thereof. At the center of the rear axle there is provided a differential 16 of any standard or conventional construction to which is connected the propeller shaft or torque tube 17 inclined slightly upwardly and extending toward the power plant at the forward portion of the vehicle.

The chassis 10, which comprises the two side rails 18 and suitable cross members, some of which are not shown, including a center cross member 19, is adapted to support an operator's cab 20, shown more or less in silhouette in Figure 1, and of course a truck body of any desired type is mounted on the chassis rearwardly of the cab 20.

It is to be understood that the present invention is equally well applicable to a tractor trailer combination or to a conventional type of truck structure, and if the former type of construction is employed, the chassis 10 will support a suitable fifth wheel mechanism for coupling the trailer thereto.

The main or primary power plant of the vehicle includes a primary engine 22, which may be an internal combustion engine, or may be of the Diesel type if desired, and which is supported in more or less conventional manner between the side rails 18 adjacent the forward end of the vehicle and extends partially over the front end of the vehicle. It is to be understood that the present invention is not limited to any specific location of the engine 22, and the illustrated showing thereof is intended for descriptive purposes only and in no way is to be construed as limiting. This engine is provided with the usual type of cooling system, including the radiator 23 disposed forwardly thereof and suitably connected to the cylinder head of the engine and to the cylinder block in the conventional manner. A suitable fan or other mechanism may be employed for drawing air through the radiator, and a water pump is also preferably provided for circulating the cooling fluid. The particular type and arrangement of these parts forms no part of the present invention except to show the general relationship and to indicate that the engine 22 may be of any conventional type such as provided by the truck manufacturer.

Secured to the flywheel housing of the engine 22 is a suitable clutch housing 24 enclosing a conventional type of clutch mechanism, which is adapted to be controlled through suitable pedal operation or automatically, as desired. To the rear portion of the clutch housing 24 there is secured a transmission case 25 containing any type of suitable truck transmission, such as is normally provided with such vehicles, including a clutch shaft 24' (Figure 1) into the rear end of which propeller shaft 17 is journalled. This transmission has a pedestal portion 26 through which the gear shifting lever 27 extends, the lever 27 being adapted for shifting the gears in the transmission through the various speed ratios.

Figure 2:
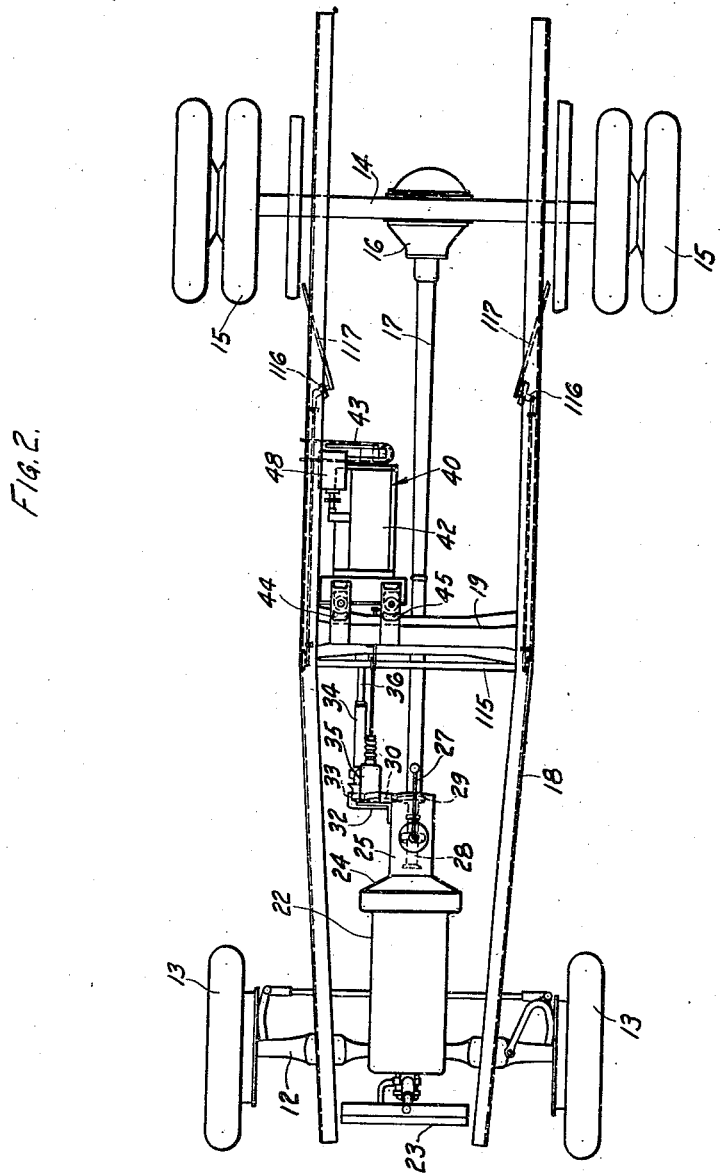
Figure 2 is a top plan view of the vehicle chassis shown in Figure 1.

The transmission is adapted to be provided with a countershaft 28, which is shown in dotted lines in Figures 1 and 2, that carries a gear 28' driven by a driving gear 25' on the clutch shaft 24'. The countershaft 28 departs from the conventional style in that at one end thereof there is provided a gear 29 keyed to the shaft and intermeshing with a gear 30 enclosed within a suitable laterally extending housing 32 which is bolted or otherwise secured to the side of the transmission case.

Within the housing 32 there is provided a third gear 33 having constant meshing engagement with the gear 30, and therefore adapted to rotate with the rotation of the countershaft 28. From the laterally extending housing 32, which may be termed a power input for the transmission, there is provided a torque transmitting or lay shaft, indicated generally at 34, which is connected through the universal joint 35 to the gear 33 and which has a splined extension 36 connected through a second universal joint 37 to the clutch shaft of a clutch 38, which may be of the overrunning type described in the copending application of Donald D. Ormsby, Serial No. 256,947, filed February 17, 1939. It will therefore be apparent that whenever the transmission 25 is in operation there will be a certain speed relation between the countershaft 28 and the lay shaft 34 regardless of the direction of transmission of torque therebetween. The lay shaft 34 is preferably made with the sliding joint therein to accommodate variations in movement between the main power plant assembly and the supplementary or booster power plant assembly, which is indicated generally at 40. This booster power plant assembly includes an engine 42, which may be any standard type of internal combustion engine or Diesel engine and which is supported from the side rail 18 and the cross member 19 by means of suitable brackets 43, 44 and 45, riveted or otherwise secured to these frame members.

Preferably, the motor is hung from the brackets 44 and 45, as shown more clearly in Figure 1, and is cushioned relative thereto by suitable rubber biscuits 46, or like cushioning means which resiliently support the motor in position but allow it to float in cushioned relationship to the frame. Similarly, rubber biscuits 47 are provided between the engine 42 and the bracket 43 to support the forward end of the engine, it being noted that the engine 42 is mounted in a direction opposite to the engine 22 so that the output ends of the engines extend toward each other with the engine 42 being laterally offset with respect to the engine 22 at one side of the propeller shaft 17. Preferably, the crankshaft of the engine 42 is provided at its forward end with a pulley or similar driving means for driving a generator 48 supported at the side of the engine assembly, and which may also include a water pump or similar means for circulating cooling fluid from the engine 42 through a suitable radiator (not shown). The output end of the crankshaft of the engine 42 extends into the flywheel housing 49, and is there connected to the clutch 38 so that the engine 42 may be clutched to the shaft 34.

From the description of the structure up to this point it will be apparent that the engine 42 can serve as a supplemental or booster engine for the power plant of the vehicle, since when the engine 42 is in operation it will drive the shaft 34 and thereby impart torque through the gears 33 and 30 to the countershaft 28 of the transmission 25. This torque will be supplemental to the torque of the main power plant 22, and consequently will increase the torque output from the transmission to the propeller shaft 17, thus supplying the additional torque from the booster engine 42 to the driving axle 14. Thus the present system includes means for developing additional torque and transmitting the same to the drive train of the vehicle for supplementing the normal torque supplied by the primary engine to increase the torque transmitted to the driving axle for giving the vehicle either more speed or more power whenever the engine 42 is in operation.

While it is apparent the control of the engine 42 might be manual with an additional starting system and controls for this engine provided for the operator of the vehicle, so that at any time when he desired additional torque either for climbing grades or for producing a predetermined speed of the vehicle he could start the engine 42 and bring it up to a speed so that it would impart torque through the shaft 34 to the transmission, I contemplate providing an automatically operating control system for starting the engine 42 and delivering its torque to the vehicle under certain predetermined conditions.

Figure 3:
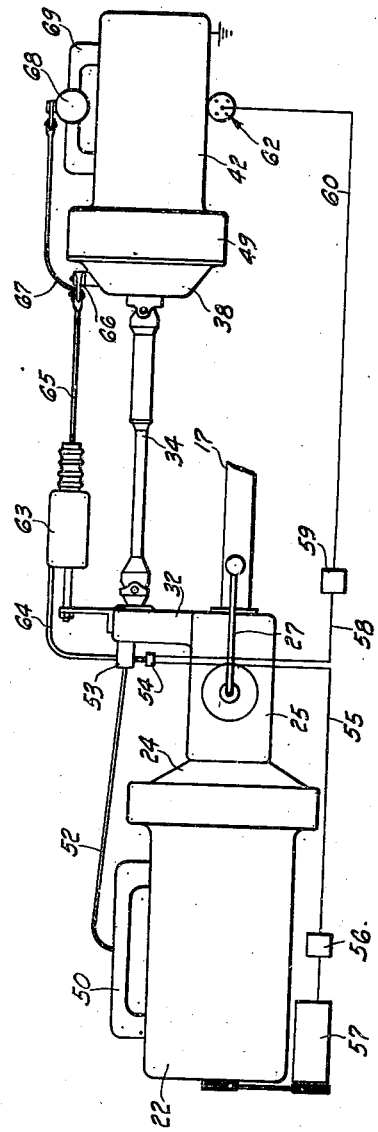
Figure 3 is a diagrammatic showing of one form of control for the system.

Considering now in further detail the manner in which the booster engine may be automatically controlled to impart its driving torque to the vehicle, I have provided in Figure 3 an optional control system that can be employed for this purpose. The primary reason for requiring the automatic control is to eliminate the human element which would be present if this control were subject to the operator of the vehicle, and to make sure that the supplemental torque will be employed only under the conditions for which it is required. For example, it is contemplated that this supplementary booster unit be employed in order to maintain the vehicle above a predetermined minimum speed when climbing grades of a certain percentage slope. Inasmuch as the conditions under which the booster torque will be required may vary in different localities or in different legislative districts, it is essential that the control system be sufficiently flexible to allow automatic control of the equipment under these varying requirements.

In the control system shown in Figure 3 the manifold 50 of the main or primary engine 22 has a suction connection 52 thereto which terminates in a vacuum controlled valve 53 adapted to be mounted on the power take-off housing 32. The valve 53 may be arranged so that it will be opened on the occurrence of relatively low vacuum in the manifold 50, such as occurs when the throttle of the primary engine 22 is wide open. It is desirable that the valve 53 be opened only when the vehicle speed is within a predetermined range where the additional power from the engine 42 is required. Therefore the valve 53 is conditioned or released for operation or opening by means of a control mechanism 54, such as a latch, which is preferably electrically actuated and has one side of its operating mechanism connected through the conductor 55 and the relay 56 to the generator 57 of the primary engine 22. The opposite terminal of control mechanism 54 is connected through conductor 58 and control relay 59 to the conductor 60 leading to the ignition system indicated generally at 62 for the supplemental or booster engine 42.

Preferably the relay 56 is so designed that it will not close the circuit between the generator 57 and the conductor 55 until the speed of the vehicle, that is, the speed of engine 22, is above a predetermined minimum. This is to safe-guard the drive axle of the vehicle so that the booster engine will not operate at very low speeds of the vehicle such as in starting away from a stop or the like where the application of too much torque through the very low gear ratios would impose too great a strain on the driving axle. In one preferred system of control the relay 56 may be set so that it does not operate until the vehicle speed is above 10 miles per hour. The operation of this relay merely conditions the control mechanism 54 for operation, but obviously will not allow this mechanism to operate until such time as the circuit is completed through the control relay 59 which is employed for energizing the ignition circuit of the secondary or supplemental power unit.

The control relay 59 is preferably set so that it will cut in at engine speeds below 35 miles an hour and will stay in energized position until a minimum engine speed of 20 miles an hour is reached, assuming direct driving engagement or high gear operation. In other words, during this speed range the relay 59 will be closed to effect the energization of the ignition circuit of the engine 42. However, this in itself will not operate the engine 42 without some means for starting the engine. This is provided by means of the vacuum controlled clutch operating mechanism 63 which is connected through the conduit 64 to the valve 53. The mechanism 63 includes a cylinder having a plunger therein provided with the extending arm 65, the plunger being normally biased by means of a suitable spring or the like to extended position. When the valve 53 is allowed to open under the influence of control mechanism 54, which occurs only when both relays 56 and 59 are energized, it provides for communication between conduits 52 and 64. The valve 53 is arranged, as set forth above, so that it will be opened only under substantially full open throttle conditions, at which time, even though the vacuum in manifold 50 is relatively low, it is sufficient so that the mechanism 63 will be actuated to retract arm 65 thereby actuating the clutch engaging arm 66 to engage the clutch 38 between lay shaft 34 and engine 42. Inasmuch as lay shaft 34 is being driven from the countershaft of the transmission this results in cranking the motor 42, and since the ignition circuit 62 is also energized, the engine 42 starts and is automatically brought up to full speed by reason of the connection 67 from the arm 65 to the throttle valve in the carburetor 68 connected to the intake manifold 69 of the engine 42. As the engine 42 thus comes up to full speed it overcomes the cranking effort of the shaft 34 and starts to deliver torque to this shaft, thereby imparting torque to the countershaft of the transmission 25 to supplement the normally available torque of the engine 22. This torque is continuously delivered by the engine 42 as long as a full open throttle condition exists at the primary engine 22, and the speed of the vehicle remains within the range of 35 to 20 miles per hour.

If the speed of the vehicle drops below 20 miles per hour the control relay 59 is de-energized, thereby deenergizing the ignition circuit for the booster engine 42 and thus stopping the booster engine. Thus the operator, if he still requires additional torque, must shift into a lower speed ratio and again bring about a condition of full open throttle. Due to the fact that the relay 59 is controlled as a function of engine speed and not propeller shaft speed, in the lower gear ratio the engine speed will increase to a point where the relay 59 will again be energized, and under full open throttle conditions the booster engine 42 will again deliver its torque to the driving train. However, if the speed of the vehicle gets fo a point below the setting of relay 56, the entire booster control system is rendered inoperative, as under such conditions the imparting of additional torque to the drive axle would place too severe a strain thereon.

Similarly, if when the booster engine 42 is operating the additional torque supplied thereby is sufficient to increase the speed of the vehicle above 35 miles an hour, the relay 59 will be de-energized, thereby cutting out the booster engine, as above such speeds it is not contemplated in this particular embodiment of the invention that the booster engine be operated.

Another factor controlling the operation of the booster engine is the throttle condition at the primary engine. For example, if for some reason within the speed range of 20 to 35 miles per hour the operator does not have a full or substantially full open throttle due to the fact that he does not want to drive any faster than this speed, the booster engine will not be operated due to the fact that the clutch 38 will be released because of the vacuum condition at the mechanism 63. This disengages the booster engine 42 from the shaft 34 so that whether the booster engine operates or not, it cannot deliver torque to the driving train of the vehicle.

It will be obvious that relays 56 and 59 can be of any desired type and may be designed to operate at any required point, and the speed ranges and limits described in connection with the system shown in Figure 3 are to be understood as being exemplary in character and only for the purpose of describing one manner in which the mechanism might be set for operation, it being obvious that the speed range could be widened or narrowed, raised or lowered, or the throttle control range may be increased to, say, anywhere from 60% full throttle up to full throttle position.

One of the features of the present invention is the fact that this system does not interfere in any substantial manner with the conventional type of power plant and drive mechanism installed in a vehicle, and consequently can be added to any vehicles now in operation without requiring any appreciable change in construction—requiring only a connection to the side of the transmission and the installation of the control system which is mostly electric. One chassis change which has to be made on certain types of vehicles is the shifting of the brake equalizing mechanism in order to have this mechanism pass around the booster engine 42. This is shown clearly in Figure 2 in dotted lines in which the brake equalizing cross rod 115 has the connections for the rear wheels extending within the side rails 18 and supported at the side rails, as indicated at 116 for the connections 117 to the rear wheel brakes of the vehicle. Other than this chassis change and the mounting of the supporting brackets 43, 44 and 45 on the chassis, the installation of such a booster unit in conventional type vehicles is simple and inexpensive, and can be done by any competent garage or service station mechanic.

It is therefore believed apparent that I have provided a novel type of power system which allows the use of additional torque under certain predetermined conditions but eliminates the expense of operating this additional power supply except at such times that its operation is required, and which therefore renders the entire system very economical in use.

I am aware that numerous changes can be made in the location of the various constituent parts of the assembly herein shown and descrribed and that connection of these parts to other parts may be modified or the inter-relation of the driving connections may be changed without departing in any fundamental manner from the broad concepts and principles disclosed herein. It is intended that the drawings and detailed description hereof be considered merely as exemplifying one manner in which the invention may be carried out and should not be construed in any manner as limiting the invention, but limited only as defined by the scope and spirit of the appended claims.

I claim:

1. In combination, a vehicle chassis including longitudinally extending side rails, a main power unit supported centrally between said side rails at one end of the chassis, a transmission in alinement with and connected thereto having a main shaft and a countershaft, a driving axle for said chassis connected to said transmission main shaft, a secondary power unit supported adjacent one side rail intermediate said transmission and axle and facing in the opposite direction to said main power unit, and means including said countershaft operable to connect said secondary power unit to said transmission main shaft for supplementing the torque to said main power unit.

2. The combination, in a vehicle having a frame including spaced longitudinal side rails, a primary power unit centrally mounted between said rails at one end of said frame, a transmission coupled to one end of said engine in longitudinal alinement therewith between said rails and having a countershaft, a secondary power unit mounted on the inner face of one of said rails rearwardly of said transmission, a forwardly extending lay shaft connected to one end of said secondary unit, and a laterally projecting gearing connection between the free end of said lay shaft and the rear end of said transmission countershaft.

3. The combination of claim 2 wherein said two power units are mounted to face in opposite directions in said frame.

4. In combination, a vehicle chassis having transversely spaced side rails connected intermediate their ends by a cross member, a main power unit comprising an engine and transmission mounted centrally between said rails forwardly of said cross member in longitudinal alinement, a countershaft in said transmission, a laterally projecting gear train at one side of said transmission connected to said countershaft, a second engine mounted rearwardly of said cross member adjacent one of said side rails, and a lay shaft connected between said second engine and said gearing.

5. In combination, a primary power unit, a clutch therefor, a drive axle, a propeller shaft and transmission disposed between said axle and unit with the transmission connected to said clutch to form a longitudinally alined torque transmitting connection therebetween, said transmission having a countershaft, a secondary power unit mounted parallel to said propeller shaft in laterally offset position and having a power shaft extending forwardly toward said primary power unit, and a lateral geared connection between said transmission countershaft and power shaft, whereby the torque of said secondary unit is applied to said transmission through a shaft other than that through which the torque of the primary unit is applied.

6. The combination of claim 5 further characterized in the provision of a clutch between said secondary unit and said power shaft.

7. The combination of claim 5 wherein said lateral geared connection is so constructed and arranged that said power shaft is rotating whenever torque is transmitted through said transmission from said primary unit.

8. In combination, a chassis comprising spaced longitudinal side rails, a cross member connecting said rails intermediate their ends, an engine centrally mounted between said rails at the forward end of said chassis, a transmission rigidly bolted to said engine in longitudinal alinement therewith forwardly of said cross member, a propeller shaft connected to the main shaft of said transmission and passing longitudinally between said rails beneath said cross member, a laterally off-set second engine disposed rearwardly of said cross member and having suspension from said cross member and the adjacent side rail, a clutch for said second engine bolted thereto adjacent said cross member, a power shaft connected at one end to said clutch and extending forwardly of said chassis beneath said cross member, the forward end of said shaft terminating adjacent the rear end of said transmission, and a transverse geared connection between the countershaft of said transmission and said forward end of said shaft.

9. In a vehicle chassis having a pair of laterally spaced side rails spaced apart by transverse cross members, a primary power unit mounted at the front end of said chassis intermediate said rails and having a transmission bolted thereto in longitudinal alinement, a propeller shaft leading from the main shaft of said transmission to the rear of said chassis, one of said cross members being disposed rearwardly of said transmission above said propeller shaft, a supplemental power unit mounted adjacent the inner face of one side rail rearwardly of said cross member and facing rearwardly relative to said chassis, a clutch housing secured on said supplemental unit adjacent said cross member, a lay shaft extending forwardly parallel to said propeller shaft from the clutch housing to adjacent the rear end of said transmission, and laterally extending gearing connecting said forward end of said lay shaft to the countershaft of said transmission.

10. Means for connecting a pair of longitudinally spaced and laterally offset power units to a common transmission having a main shaft, a countershaft and gearing therebetween, comprising a clutch shaft leading from one unit and journalling one end of said main shaft, said clutch shaft having a driving gear driving said countershaft, the other unit having a lay shaft connected thereto and extending parallel to and overlapping the rear end of said transmission, and transverse gearing connecting the lay shaft and said transmission gearing.

11. In combination, in a vehicle having a frame, a primary power unit adjacent one end of the frame, a transmission connected thereto and having a countershaft, a propeller shaft driven by said transmission, a secondary power unit at one side of said frame intermediate the ends thereof, a clutch thereon, a forwardly extending lay shaft connected to said clutch, and gearing between said transmission countershaft and the forward end of said lay shaft.

12. In combination, in a vehicle, a main power unit including an engine and transmission, a propeller shaft connected to said transmission, a secondary power unit laterally and longitudinally offset rearwardly of said main power unit, and means spaced laterally of and paralleling said propeller shaft adapted to connect said secondary power unit to said transmission forwardly of said propeller shaft.

13. In combination, a primary power unit, a clutch therefor, a propeller shaft and transmission disposed with the transmission connected to said clutch to form a longitudinally alined torque-transmitting connection, said transmission having a countershaft, a secondary power unit mounted parallel to said propeller shaft in laterally offset position and having a power shaft extending forwardly toward said primary power unit, and a lateral geared connection between said transmission countershaft and power shaft, whereby the torque of said secondary unit is applied to said transmission through gearing other than that through which the torque of the primary unit is applied.

14. In combination, in a vehicle having a frame including spaced longitudinally side rails, a primary power unit centrally mounted between said rails at one end of said frame, a transmisison coupled to one end of said engine in longitudinal alinement therewith between said rails and having a shaft, a propeller shaft extending longitudinally rearwardly from said transmission, a secondary power unit mounted between the inner face of one of said rails and said propeller shaft rearwardly of said transmission, a forwardly extending lay shaft connected to one end of said secondary unit, and a laterally projecting gear between the free end of said lay shaft and the rear end of said transmission.

15. In combination, a main power unit having a transmission including a countershaft, a power input gear on said countershaft, a supplemental power unit, a shaft and gearing extending from said supplemental unit and engaging said power input gear, and a clutch at said supplemental unit operable to connect said supplemental unit to said shaft and gearing.

16. In combination, a primary power unit, a secondary power unit laterally offset from said primary power unit and facing in the opposite direction to that of said primary power unit, a transmission connected to said main power unit intermediate said units and having a countershaft, an output shaft from said secondary power unit extending parallel to said countershaft and laterally overlying the rear end thereof, a gear on each of said shafts, and an idler gear interposed therebetween whereby the torque from said secondary unit is transmitted in the proper direction to said countershaft through said gears.

17. In combination, a primary power unit, a transmission therefor having a countershaft, a supplemental power unit laterally offset from said first unit, a laterally projecting power input on said transmission including a gear on said countershaft, and a meshing idler gear, a shaft projecting from said second unit into said power input and having a gear driving said idler gear, and clutch means between said shaft and said second unit.

18. The combination of claim 17 wherein said supplemental power unit faces in a direction opposite to that of said primary power unit and is spaced rearwardly thereof.

19. Means for connecting a pair of longitudinally spaced and laterally offset power units to a common transmission having a main shaft, a countershaft and change-speed gearing therebetween comprising a clutch shaft leading from one unit and journalling one end of said main shaft, said clutch shaft having a drive gear driving said countershaft, the other unit having a lay shaft connected thereto and extending parallel to and overlapping the rear end of said transmission countershaft, transverse gearing between said lay shaft and countershaft including an idler gear therebetween connecting the lay shaft to said transmission countershaft for rotation in the same direction as said countershaft is driven by said driving gear.

GEORGE D. WILCOX.

REFERENCES CITED

The following references are of record in the file of this patent:

UNITED STATES PATENTS

| Number | Name | Date |
|---|---|---|
| 845,850 | Carter | Mar. 5, 1907 |
| 2,132,450 | Wolf | Oct. 11, 1938 |
| 1,768,530 | Short | June 24, 1930 |
| 2,085,897 | Burrows et al. | July 6, 1937 |

FOREIGN PATENTS

| Number | Country | Date |
|---|---|---|
| 11,155 | French | Oct. 28, 1909 |